United States Patent
Hayashi et al.

(10) Patent No.: US 7,842,413 B2
(45) Date of Patent: Nov. 30, 2010

(54) RECHARGEABLE BATTERY TO REDUCE INTERNAL RESISTANCE AND METHOD OF MANUFACTURING THE SAME

(75) Inventors: Kiyoshi Hayashi, Aichi (JP); Hideki Kasahara, Aichi (JP)

(73) Assignee: Panasonic EV Energy Co., Ltd., Kosai-Shi (JP)

( * ) Notice: Subject to any disclaimer, the term of this patent is extended or adjusted under 35 U.S.C. 154(b) by 1070 days.

(21) Appl. No.: 11/553,413

(22) Filed: Oct. 26, 2006

(65) Prior Publication Data
US 2007/0099075 A1 May 3, 2007

(30) Foreign Application Priority Data
Oct. 28, 2005 (JP) .............................. 2005-313728

(51) Int. Cl.
*H01M 2/24* (2006.01)
*H01M 2/26* (2006.01)
*H01M 6/00* (2006.01)

(52) U.S. Cl. ....................... 429/160; 429/161; 429/211; 29/623.1; 29/623.4

(58) Field of Classification Search ........................ None
See application file for complete search history.

(56) References Cited

U.S. PATENT DOCUMENTS
2003/0157402 A1 * 8/2003 Hamada et al. ............. 429/153

FOREIGN PATENT DOCUMENTS
JP 2001-93503 4/2001
JP 2003-282043 10/2003

* cited by examiner

*Primary Examiner*—Dah-Wei D Yuan
*Assistant Examiner*—Kwang Han
(74) *Attorney, Agent, or Firm*—Workman Nydegger

(57) ABSTRACT

A rechargeable battery reducing internal resistance and equalizing the distribution of current flow in an electrode plate assembly. A plurality of battery jars are connected to one another through partition walls. A power generation element including an electrode plate assembly, in which a cathode plate and an anode plate are stacked together with a separator arranged in between, and collector plates joined to opposite ends of the electrode plate assembly are accommodated in each battery jar. The collector plates on opposite sides of the partition wall formed between two adjacent battery jars are connected to each other. Connection holes are formed in the partition wall at a plurality of locations. Connection projections, which project from the collector plates, are fitted into the connection holes and welded. The connection projections have distal ends that are in contact with each other.

9 Claims, 6 Drawing Sheets

RECHARGEABLE BATTERY TO REDUCE INTERNAL RESISTANCE AND METHOD OF MANUFACTURING THE SAME

CROSS-REFERENCE TO RELATED APPLICATIONS

This application is based upon and claims the benefit of priority from prior Japanese Patent Application No. 2005-313728, filed on Oct. 28, 2005, the entire contents of which are incorporated herein by reference.

BACKGROUND OF THE INVENTION

The present invention relates to a rechargeable battery and a method of manufacturing the same, and more particularly, to the reduction of internal resistance in a rechargeable battery having a configuration in which power generation elements respectively accommodated in battery jars connected to one another through partition walls, are connected one another.

An example of a rechargeable battery in the prior art will now be described with reference to FIG. 1. A rechargeable battery 100 includes a thin rectangular battery jar 3 formed by connecting a plurality of bar-shaped battery jars 4. Each battery jar 4 has a narrow side and a wide side. The wall on the narrow side is shared by an adjacent battery jar 4 and functions as a partition wall 5. The battery jars 4 have upper open ends closed by the same integral lid 6. Connection holes 7 are formed at the upper parts of the outer narrow walls of the two battery jars 4 located at the two ends of the connected battery jars 4 and the partition walls 5 between the adjacent battery jars 4. A power generation element 11, which includes an electrode plate assembly 8 of a cathode plate and an anode plate stacked together with a separator arranged in between, and collector plates 10a and 10b, which are connected to the two ends of the electrode plate assembly 8, are accommodated in each battery jar 4 together with an electrolysis solution to form a cell 2. The electrode plate assembly 8 includes leads 9a and 9b respectively provided for the cathode plate and the anode plate and extending from opposite sides. The collector plates 10a and 10b are respectively connected to the sides of the leads 9a and 9b.

A connection projection 12, which is fitted into the connection hole 7, projects from the upper part of each of the collector plates 10a and 10b. Spot welding is performed to connect the connection projections 12 of the collector plates 10a and 10b between the two adjacent battery jars 4. The spot welding is performed in the upper opening of the battery jar 4. Cathode or anode connection terminals 13 are attached to the connection holes 7 in the outer narrow walls of the two battery jars 4 located at the two ends of the connected battery jars 4. The connection terminals 13 are spot welded and connected to the connection projections 12 of the associated collector plates 10a and 10b. In this manner, the plurality of battery cells 2 embedded in the rectangular battery jar 3 are connected in series to form a rechargeable battery having connection terminals on its two both ends (refer to, for example, Japanese Laid-Open Patent Publication No. 2001-93503). In FIG. 1, a communication passage 24 functions to equalize the inner pressure of the connected battery jars 4. A hole 25 is formed to receive a temperature sensor. A safety valve (not shown) is provided to release pressure when the inner pressure of the battery jars 4 become higher than or equal to a certain pressure.

Figure 1:
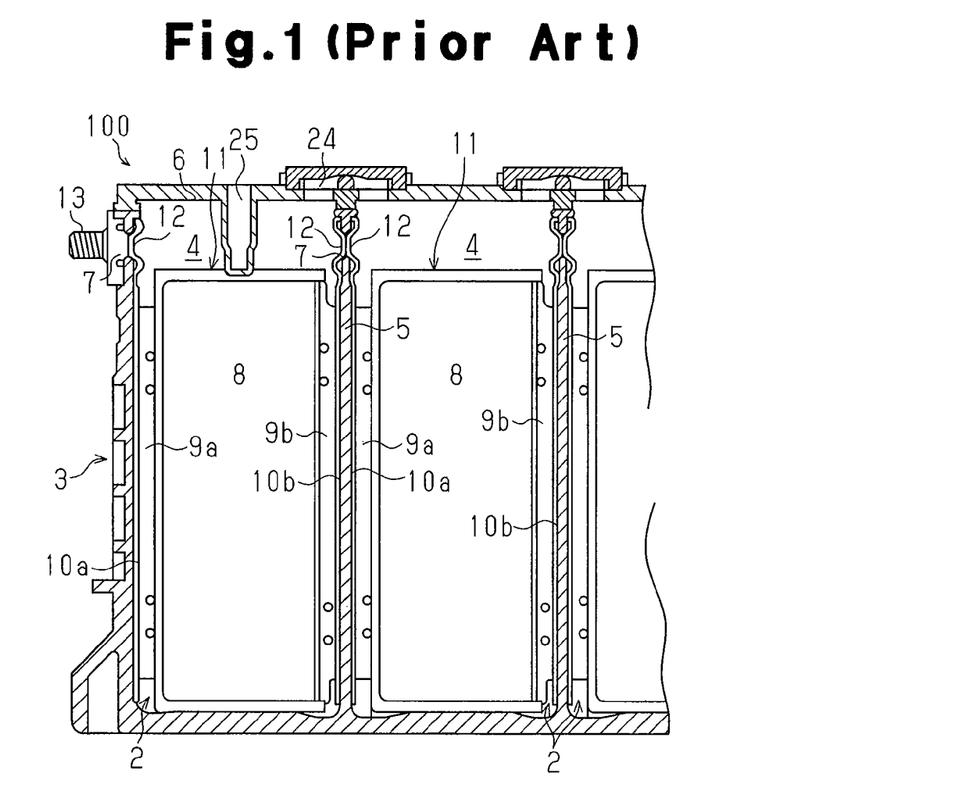
FIG. 1 is a partial cross-sectional view of a rechargeable battery in the prior art.
Figure 2:
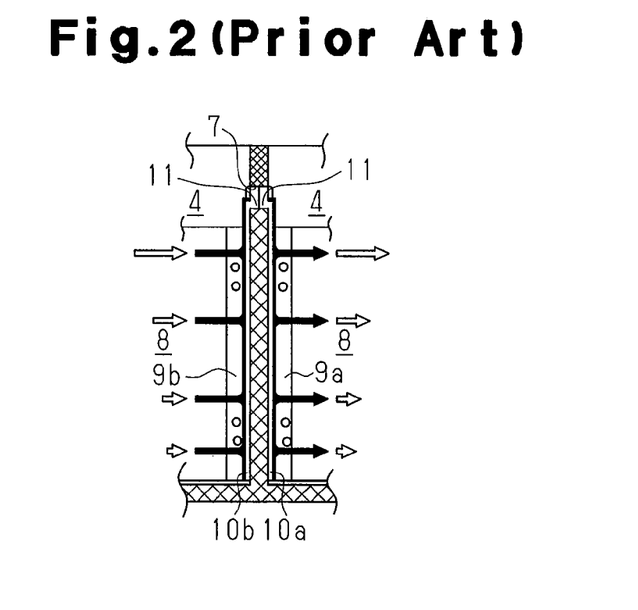
FIG. 2 is a schematic diagram showing a conductive path in the rechargeable battery of the prior art.

A conductive path extending from the cathode plate and the anode plate to the corresponding leads 9a and 9b and collector plates 10a and 10b is short in the prior art rechargeable battery 100 shown in FIG. 1. However, the collector plates 10a and 10b are connected to the distal ends of the connection projections 12 at the upper portions of the collector plates 10a and 10b at one location as shown by arrows in FIG. 2. Thus, the connection path detoured in such a manner lengthens the conductive path. Further, the collector plates 10a and 10b are connected to each other at only one location. Therefore, the internal resistance becomes high in the rechargeable battery 100 of the prior art. Additionally, the detoured connection path results in uneven current distribution between portions close to and portions distant from the connected portion of the collector plates 10a and 10b as shown by the white arrows. Thus, the entire electrode plate assembly 8 cannot generate power evenly thereby causing a large loss in the rechargeable battery 100 of the prior art.

Figure 3:
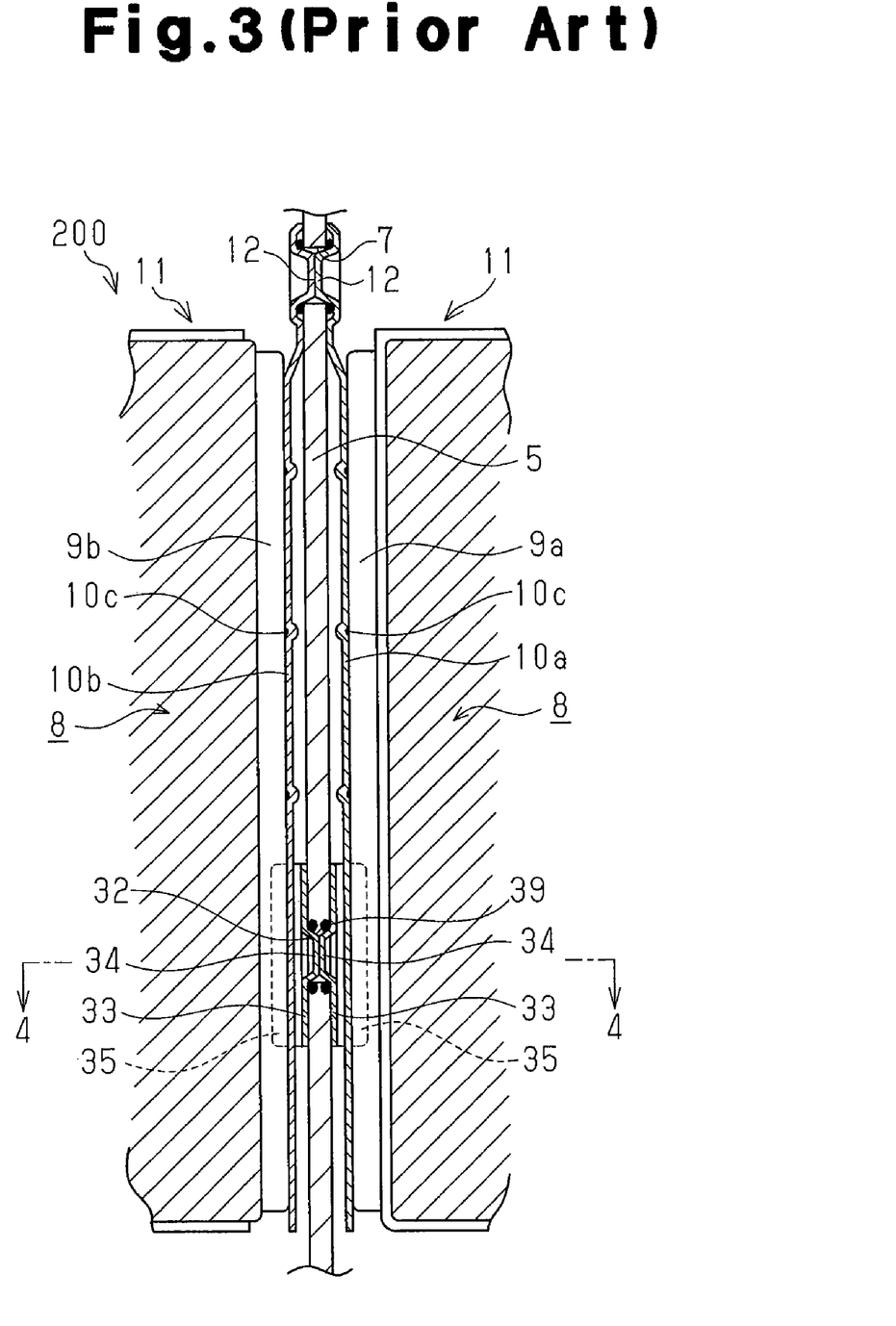
FIG. 3 is a cross-sectional view showing the main parts of a further rechargeable battery in the prior art.
Figure 4:
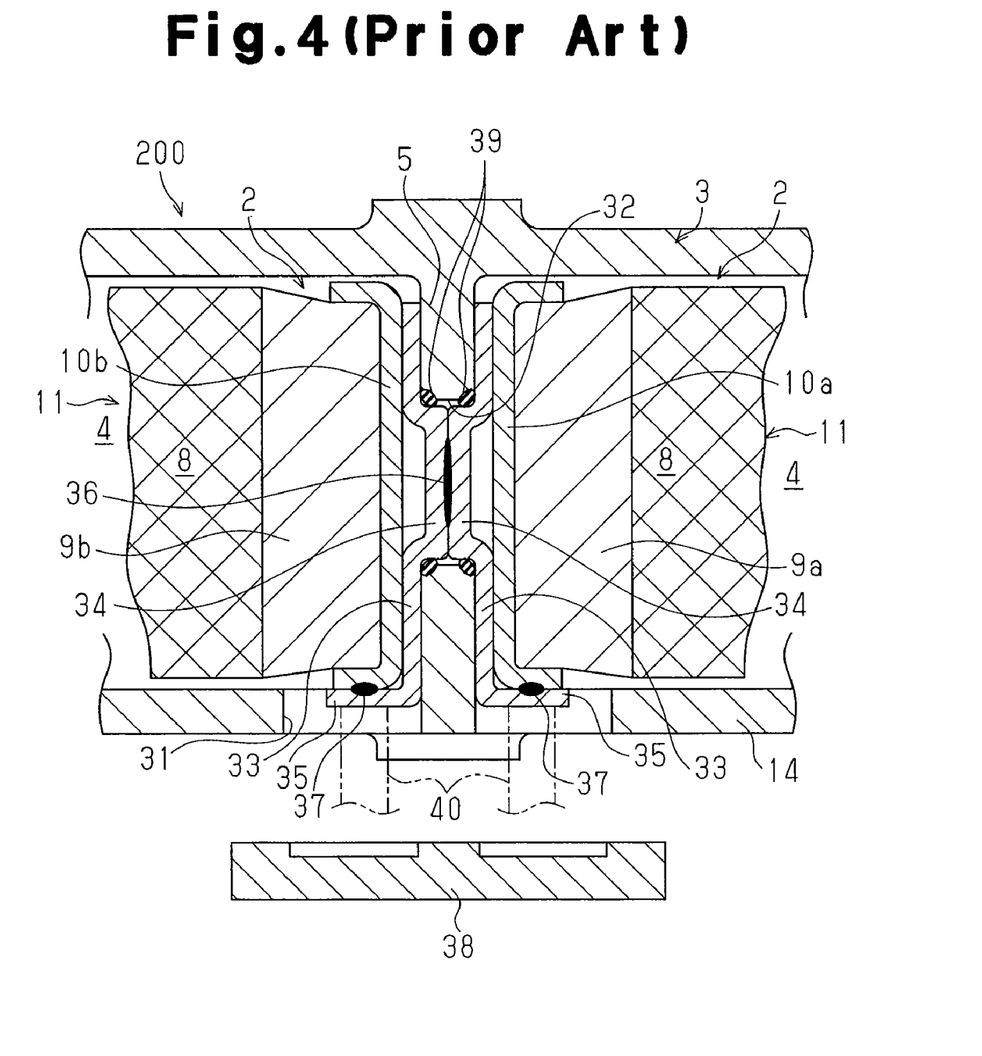
FIG. 4 is an enlarged view taken along line 4-4 in FIG. 3.

To solve such a problem, a further rechargeable battery 200 has been proposed in the prior art (refer to, for example, Japanese Laid-Open Patent Publication No. 2003-282043). As shown in FIGS. 3 and 4, in addition to the upper parts of the collector plates 10a and 10b being connected through the connection hole 7 formed at the upper part of the partition wall 5, the rechargeable battery 200 includes an opening 31 formed at the lower part of at least one side wall 14 of a rectangular battery jar 3. The openings face the interiors of the battery jars 4 on opposite sides of the partition wall 5. Two electrically conductive connection plates 33 are arranged on opposite sides of the partition wall 5. Each connection plate 33 includes a connection projection 34 and a connection piece 35. The connection projections 34 of the connection plates 33 are connected to each other through a connection hole 32, which is formed at the lower part of each partition wall 5, by a welded portion 36. The connection pieces 35 face toward the corresponding openings 31. The collector plates 10a and 10b contact the inner surface of the connection piece 35 with the power generation element 11 accommodated in the corresponding battery jar 4. In a state in which a welding electrode 40 is in contact with the connection pieces 35 located on each side of the partition wall 5, welding current flows to form a welded portion 37 connecting the collector plates 10a and 10b and the connection piece 35. Then, the opening 31 is sealed with a sealing plate 38 so as to isolate each battery jar 4 from one another. A seal 39 is arranged between the connection hole 32 and the connection projections 34. Joining portions 10c are defined on the collector plates 10a and 10b at positions joined with the leads 9a and 9b.

In the prior art rechargeable battery 200 shown in FIGS. 3 and 4, the collector plates 10a and 10b are connected at both the upper part and the lower part. Thus, the internal resistance is reduced to a certain extent, and the current distribution flowing through the electrode plate assembly is equalized to a certain extent. However, the collector plates 10a and 10b are directly connected to each other through welding at the upper connection portion, whereas the collector plates 10a and 10b are connected by the electrically conductive connection plates 33 at the lower connection portion. Therefore, in the prior art rechargeable battery 200, the welded portion 37 forms a connection resistance between the collector plates 10a and 10b and the connection piece 35. The electrically conductive connection plate 33 also forms an electrically conductive resistance. Further, the welded portion 36 connecting the two connection projections 34 forms a connection resistance. The sum of these resistances causes the connection resistance at the lower part to be relatively larger than the connection resistance at the upper part. As a result, the reduction of the internal resistance and the distribution of equalized current flowing through the electrode plate assembly cannot be sufficiently achieved.

When describing this with specific numerical values, the resistance for each cell 2 at the upper connection part where the connection projections 12 are welded is 0.03 mΩ. Comparatively, the connection resistance between the collector plates 10a and 10b and the connection piece 35 at the lower connection part is 0.05 mΩ. The electrically conductive resistance of the electrically conductive connection plate 33 is 0.05 mΩ. The resistance for each cell 2 at the welded portion 36 where the connection projections 34 are welded is 0.03 mΩ. This amounts to a total of 0.13 mΩ and indicates that the resistance at the lower connection part is significantly greater than that at the upper connection part. Even if the width of the electrically conductive connection plates 33 were increased and a plurality of (two) connection projections 34 were used, the resistance would still be 0.08 mΩ. Furthermore, even if the connection pieces 35 were to be welded at two sides of the collector plates 10a and 10b, the resistance would still be 0.68 mΩ. Thus, the resistance of the lower connection part would still be larger than that at the upper connection part.

SUMMARY OF THE INVENTION

It is an object of the present invention to provide a rechargeable battery for reducing the internal resistance and equalizing the distribution of the current flowing through the electrode plate assembly and a method for manufacturing such a rechargeable battery.

One aspect of the present invention is a rechargeable battery having a plurality of battery jars including two adjacent battery jars. A partition wall is arranged between the two adjacent battery jars. The partition wall includes a plurality of connection holes. A plurality of power generation elements are respectively accommodated in the plurality of battery jars. Each of the plurality of power generation elements includes an electrode plate assembly, which has at least one cathode plate and at least one anode plate that are stacked together, and two collector plates connected to opposite sides of the electrode plate assembly. The two collector plates each include a plurality of connection projections. One of the two adjacent battery jars has its plurality of connection projections, which are arranged on one of the two collector plates located on a side of the power generation element adjacent to the other one of the two adjacent battery jars, welded and connected through the plurality of connection holes of the partition wall to the plurality of connection projections, which are arranged on the collector plate located on a side of the power generation element adjacent to the one of the two adjacent battery jars in the other one of the two adjacent battery jars.

A further aspect of the present invention is a method for manufacturing a rechargeable battery. The method includes the steps of forming a plurality of battery jars including two adjacent battery jars connected to each other through a partition wall having a plurality of connection holes; preparing an electrode plate assembly including at least one cathode plate and at least one anode plate that are stacked together, the electrode plate assembly including two ends forming two leads respectively arranged in correspondence with the cathode plate and the anode plate; forming a plurality of power generation elements by joining each of two collector plates respectively including a plurality of connection projections to a corresponding one of the two leads of the electrode plate assembly; accommodating the power generation elements respectively in the plurality of battery jars; in one of the two adjacent battery jars, fitting the plurality of connection projections, which are arranged on one of the two collector plates located on a side of the power generation element adjacent to the other one of the two adjacent battery jars, into the plurality of connection holes of the partition wall; and welding and connecting the fitted plurality of connection projections to the plurality of connection projections, which are arranged on the collector plate located on a side of the power generation element adjacent to the one of the two adjacent battery jars in the other one of the two adjacent battery jars.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

In the drawings, like numeral are used for like elements throughout.

The rechargeable battery 300 according to a first embodiment of the present invention will now be described with reference to FIGS. 5 and 6. The overall structure for the rechargeable battery 300 in the present embodiment is basically the same as the overall structure for the prior art rechargeable battery 100 described with reference to FIG. 1.

Figure 5:
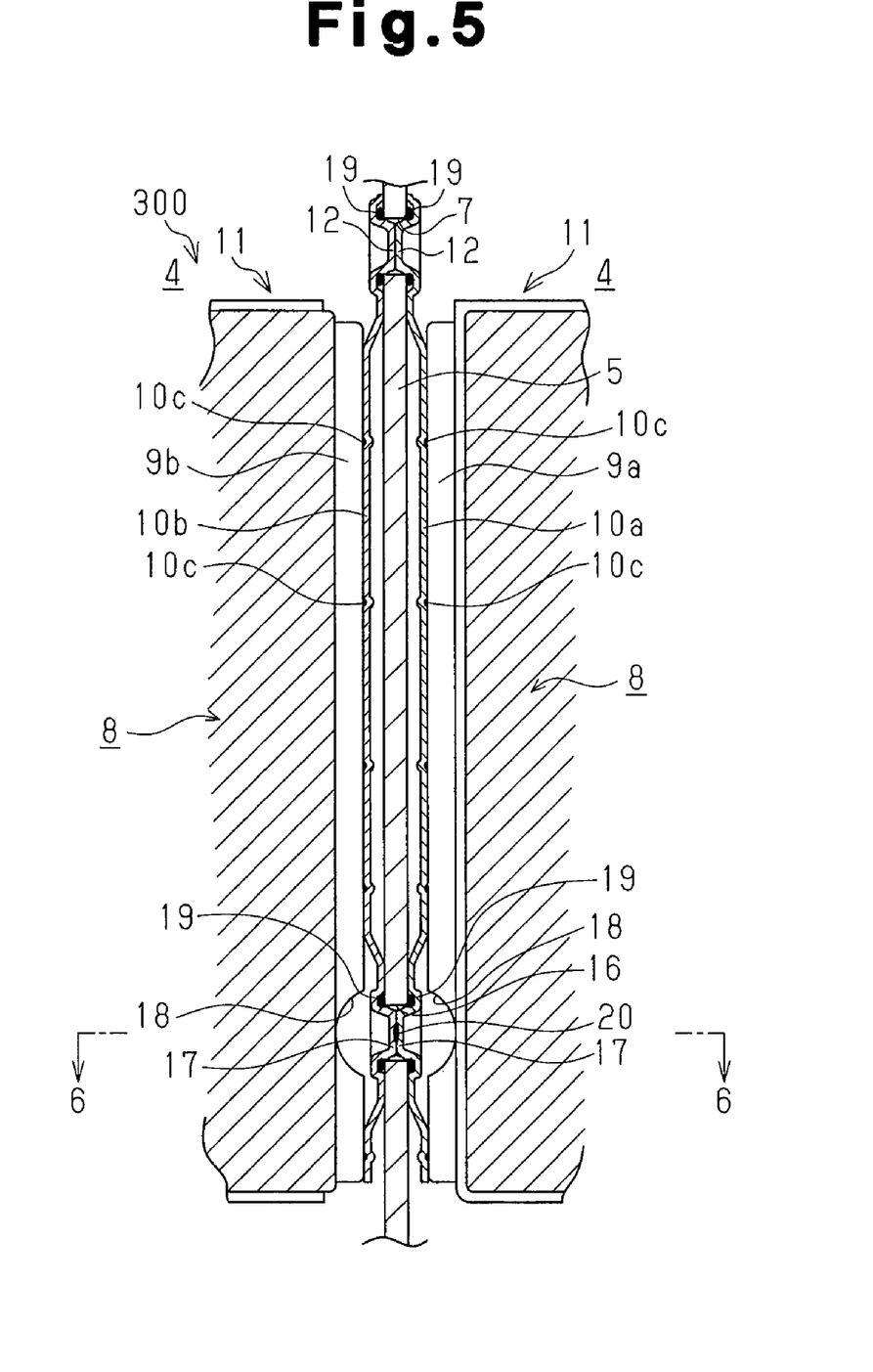
FIG. 5 is a cross-sectional view showing the main parts of a rechargeable battery 300 according to a first embodiment of the present invention.
Figure 6:
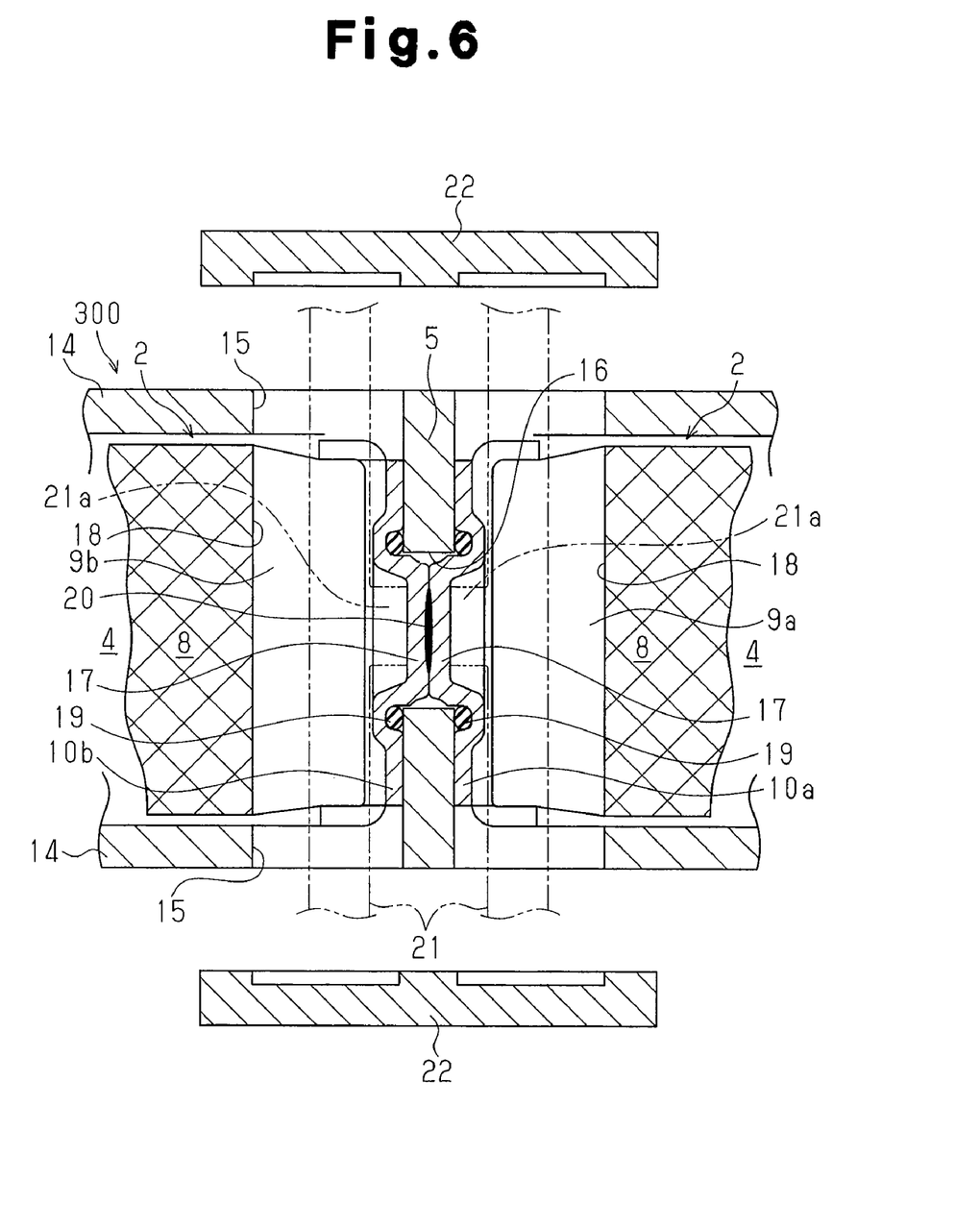
FIG. 6 is an enlarged view taken along line 6-6 in FIG. 5.

In FIGS. 5 and 6, the electrode plate assembly 8 is for a nickel-metal hydride rechargeable battery and includes a cathode plate and an anode plate stacked with a separator arranged in between. The cathode plate is formed by charging cathode active materials, the main component of which is nickel hydroxide, into a nickel foamed metal. The anode plate is formed by applying anode active materials, the main component of which is a hydrogen storing alloy, to a nickel punching metal. The leads 9a and 9b of the cathode plate and the anode plate project from two opposite sides of the electrode plate assembly 8. The positive collector plate 10a and the negative collector plate 10b are respectively connected to the leads 9a and 9b to form a power generation element 11. The power generation element 11 is inserted and accommodated in each battery jar 4 of the rectangular battery jar 3. The collector plates 10a and 10b are each formed by a metal plate such as nickel plated copper plate. A plurality of joining portions 10c are defined on the collector plates 10a and 10b at positions joined with the leads 9a and 9b at predetermined intervals in the longitudinal direction.

An opening 15 is formed at the lower part of two opposite side walls 14 of the rectangular battery jar 3 so as to face the interior of the battery jar 4 on opposite sides of the partition wall 5. A second connection hole 16, which is similar to the first connection hole 7 formed in the upper part of the partition wall 5, is formed at a position corresponding to a generally central position of the opening in the partition wall 5 with respect to the vertical direction. In the same manner as the first connection projection 12, which is fitted to the first connection hole 7 of the partition wall 5, a second connection projection 17 is fitted to the second connection hole 16. The second connection projection 17 projects from the collector plates 10a and 10b, which are connected to the ends of the electrode plate assemblies 8. In the same manner as the first connection projection 12, the second connection projection 17 is formed so that the distal ends contact each other when fitted to the second connection hole 16 from each side of the partition wall 5.

The leads 9a and 9b at the two ends of the electrode plate assembly 8 include a cut-out portion 18, which forms a space for performing welding in the rear of the second connection projection 17, at a location corresponding to the second connection projection 17 of the collector plates 10a and 10b. The joining portions 10c of the collector plates 10a and 10b joined to the leads 9a and 9b are arranged on both sides of the cut-out portion 18 at predetermined intervals in the vertical direction. A sealing material 19 is arranged between the periphery of the basal portion of the second connection projection 17 and the periphery of the second connection hole 16 of the partition wall 5 to isolate the two adjacent battery jars 4 from each other.

The distal ends of the second connection projection 17 are connected by a welded portion 20. As shown by a phantom line in FIG. 6, the welded portion 20 is formed by extending a welding electrode 21 into the rectangular battery jar 3 through the openings 15 in the two side walls 14 and the cut-out portion 18 of the leads 9a and 9b. The welding electrode 21 has a projecting middle portion forming a projection 21a, which comes into contact with the inner surface of the distal end of the second connection projection 17. The electrode 21 is supported at its two ends and pressed against the distal ends of the connection projection 17. In this state, predetermined welding current flows through the welding electrode 21 to spot weld the distal ends of the connection projections 17. After the welding, the opening 15 is sealed with a sealing plate 22 so as to isolate the battery jar 4 from each other.

A method for manufacturing the rechargeable battery 300 having the above structure will now be described. The electrode plate assembly 8 including the cathode plate and the anode plate stacked together with a separator arranged in between is formed. The cut-out portions 18 are formed in advance at the necessary sections of the leads 9a and 9b of the cathode plate and the anode plate. The power generation element 11 is formed by joining the collector plates 10a and 10b at opposite sides of the electrode plate assembly 8. The collector plates 10a and 10b have the first connection projection 12 and the second connection projection 17. The collector plates 10a and 10b preferably include portions above and below the second connection projection 17 that may be easily bent. The power generation element 11 is then inserted into each battery jar 4 of the rectangular battery jar 3 from the upper opening and accommodated therein. The first connection hole 7 and the second connection hole 16 are respectively formed at the upper part and the lower part of the partition wall 5 between two adjacent battery jars 4. Thus, during the insertion of the power generation element 11, the first connection projection 12 elastically fits into the first connection hole 7 and the second connection projection 17 elastically fits into the second connection hole 16 due to the elastic deformation of the collector plates 10a and 10b so that the distal ends contact each other. The distal ends of the first connection projections 12 fitted into the first connection hole 7 at the upper part of the partition wall 5 are spot welded and connected to each other from the upper opening of the battery jar 4. The distal ends of the second connection projection 17 fitted into the second connection hole 16 at the lower part of the partition wall 5 are spot welded and connected to each by the welding electrode 21. Welding may be performed by applying laser beam welding or the like but is preferably performed by extending the welding electrode 21 through the opening 15, which is formed adjacent to the partition wall 5 in the two side walls 14 of the rectangular battery jar 3, and the cut-out portion 18 of the leads 9a and 9b of each electrode plate at both ends of the electrode plate assembly 8. This enables efficient spot welding with the welding electrode 21 securely supported. Thereafter, the opening 15 in the two side walls 14 of the rectangular battery jar 3 is sealed with the sealing plate 22. After a predetermined amount of electrolysis solution is filled into each battery jar 4, the upper opening is closed with the lid 6. Then, the various devices are attached to complete the rechargeable battery 300.

In the above structure, the first connection projection 12 and the second connection projection 17 arranged on the collector plates 10a and 10b are respectively fitted into the first connection hole 7 and the second connection hole 16 formed in the partition wall 5 of two adjacent battery jars 4. Then, the distal ends of the first connection projections 12 and the second connection projections 17 are welded. Therefore, the collector plates 10a and 10b are directly joined with each other at the two ends of the electrode plate assembly 8 by welding a plurality of locations. Thus, each connection path does not have to be detoured, the connection path is shortened, and each connection path includes only one connection (welding) section. This significantly reduces the internal resistance. Furthermore, since the collector plates 10a and 10b are connected at a plurality of locations, the distribution of current flowing through the electrode plate assembly 8 is equalized. Since the entire electrode plate assembly 8 has a uniform power generation capability, the rechargeable battery has a high output and high performance.

It should be apparent to those skilled in the art that the present invention may be embodied in many other specific forms without departing from the spirit or scope of the invention. Therefore, the present examples and embodiments are to be considered as illustrative and not restrictive, and the invention is not to be limited to the details given herein, but may be modified within the scope and equivalence of the appended claims.

In the above embodiment, the upper ends of the collector plates 10a and 10b extend above the upper end of the electrode plate assembly 8. Further, the first connection projections 12 arranged at the upper ends of the collector plates 10a and 10b are fitted into the first connection hole 7 formed at the upper part of the partition wall 5 and the their distal ends are connected through welding. The second connection projections 17 arranged at the lower parts of the collector plates 10a and 10b are fitted into the second connection hole 16 formed at the lower part of the partition wall 5 and their distal ends are connected through welding. However, the second connection hole 16 of the partition wall 5 and the second connection projections 17 of the collector plates 10a and 10b may respectively be formed at any position in the partition wall 5 and the collector plate 10a and 10b. Thus, the upper ends of the collector plate 10a and 10b do not need to be extend above the upper end of electrode plate assembly 8 to connect the collector plates 10a and 10b. As shown in the rechargeable battery 400 shown in FIG. 7, the height of the collector plates 10a and 10b is set to the length corresponding to the height dimension of the electrode plate assembly 8. Further, a plurality of connection projections 17 are arranged at the upper part and the lower part, and a plurality of corresponding connection holes 16 are formed in the partition wall 5.

Figure 7:
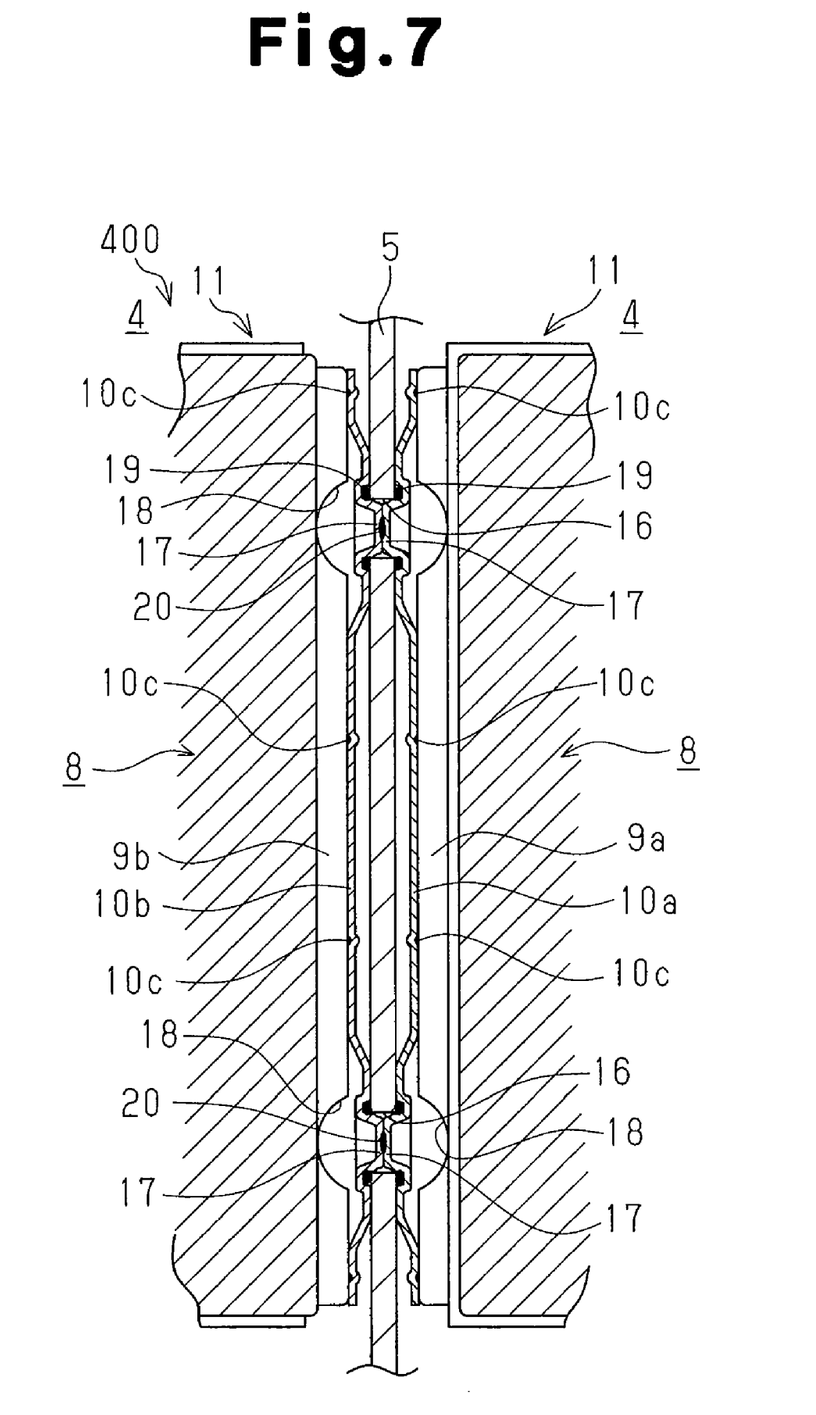
FIG. 7 is a cross-sectional view showing the main parts of a rechargeable battery according to a second embodiment of the present invention.

In the rechargeable battery 400, the upper connection path is shorter than the connection path to the upper connection projection 12. The distance from the plurality of connection projections 17 to each joining portion 10c between the collector plate 10a and 10b and the lead 9a and 9b is further equalized. This enhances the above advantage of the present invention. Furthermore, in the rechargeable battery 400, the space above the electrode plate assembly 8 in each battery jar 4 may be minimized while leaving space for gas discharge. This lowers the height of each battery jar 4 and the rectangular battery jar 3 and reduces the space occupied by the rechargeable battery 40.

In the rechargeable battery of the present invention, the plurality of connection projections arranged in the collector plates are fitted into the plurality of connection holes formed in the partition wall between the battery jars, and the distal ends of the connection projections are welded. Thus, the rechargeable battery has a structure in which the collector plates joined to both ends of the electrode plate assembly are directly connected by welding a plurality of locations. Therefore, in the rechargeable battery of the present invention, the internal resistance is greatly reduced since each connection path is short and there are a few number of connection sections on the connection path. Furthermore, the distribution of the current flowing through the electrode plate assembly is equalized, and the entire electrode plate assembly has a uniform power generation capability due to the collector plates being connected at a plurality of locations. The rechargeable battery of the present invention is thus effectively used in various types of rechargeable batteries, especially, rechargeable batteries for power supplies required to have high output and high performance.

The present examples and embodiments are to be considered as illustrative and not restrictive, and the invention is not to be limited to the details given herein, but may be modified within the scope and equivalence of the appended claims.

What is claimed is:

1. A rechargeable battery comprising:
   a plurality of battery jars including two adjacent battery jars;
   a partition wall arranged between the two adjacent battery jars, the partition wall including a plurality of connection holes; and
   a plurality of power generation elements respectively accommodated in the plurality of battery jars, each of the plurality of power generation elements including an electrode plate assembly, which has at least one cathode plate and at least one anode plate that are stacked together, and two collector plates connected to opposite sides of the electrode plate assembly, wherein the electrode plate assembly includes two ends forming two leads connected to the two collector plates;
   the two collector plates each including a plurality of connection projections integrally formed in each collector plate, wherein the two leads each include at least one cut-out portion formed in at least one position corresponding to at least one of the plurality of connection projections; and
   one of the two adjacent battery jars having its plurality of connection projections, which are arranged on one of the two collector plates located on a side of the power generation element adjacent to the other one of the two adjacent battery jars, welded and connected through the plurality of connection holes of the partition wall to the plurality of connection projections, which are arranged on the collector plate located on a side of the power generation element adjacent to the one of the two adjacent battery jars in the other one of the two adjacent battery jars.

2. The rechargeable battery according to claim 1, wherein:
   the two leads are respectively arranged in correspondence with the cathode plate and the anode plate.

3. The rechargeable battery according to claim 2, wherein each battery jar includes at least one opening formed in at least one position corresponding to the at least one cut-out portion.

4. The rechargeable battery according to claim 3, wherein the two collector plates each include a plurality of joining portions joined with the corresponding lead on the first portion and formed on each side of the at least one first connection projection.

5. The rechargeable battery according to claim 1, wherein:
   the electrode plate assembly includes two ends forming two leads respectively arranged in correspondence with the cathode plate and the anode plate; and
   the two collector plates are each arranged facing toward the corresponding lead of the two leads.

6. The rechargeable battery according to claim 5, wherein:
   the two leads each include a plurality of cut-out portions formed in a plurality of positions corresponding to the plurality of connection projections arranged on the corresponding collector plate; and
   each battery jar includes a plurality of openings formed in a plurality of positions corresponding to the plurality of cut-out portions.

7. The rechargeable battery according to claim 6, wherein the two collector plates each include a plurality of joining portions joined with the corresponding lead and formed on each side of the plurality of connection projections.

8. A method for manufacturing a rechargeable battery, the method comprising the steps of:
   forming a plurality of battery jars including two adjacent battery jars connected to each other through a partition wall having a plurality of connection holes;
   preparing an electrode plate assembly including at least one cathode plate and at least one anode plate that are stacked together, the electrode plate assembly including two ends forming two leads respectively arranged in correspondence with the cathode plate and the anode plate;
   forming a plurality of power generation elements by joining each of two collector plates respectively including a plurality of connection projections integrally formed in each collector plate to a corresponding one of the two leads of the electrode plate assembly, wherein each of the two leads includes at least one cut-out portion corresponding to at least some of the plurality of connection projections;
   accommodating the power generation elements respectively in the plurality of battery jars;
   in one of the two adjacent battery jars, fitting the plurality of connection projections, which are arranged on one of the two collector plates located on a side of the power generation element adjacent to the other one of the two adjacent battery jars, into the plurality of connection holes of the partition wall; and welding and connecting the fitted plurality of connection projections to the plurality of connection projections, which are arranged on the collector plate located on a side of the power generation element adjacent to the one of the two adjacent battery jars in the other one of the two adjacent battery jars.

9. The method according to claim 8, further comprising the steps of:

forming at least one cut-out portion in at least one position corresponding to at least one of the connection projections of the corresponding collector plate for each of the two leads; and forming at least one opening in the battery jar in at least one position corresponding to the at least one cut-out portion;

wherein said welding and connecting includes extending at least one welding electrode through the battery jar by way of the at least one opening and the at least one cut-out portion.

* * * * *